United States Patent [19]

Caron

[11] Patent Number: 4,666,241
[45] Date of Patent: May 19, 1987

[54] FIBER OPTIC CONNECTOR AND METHOD FOR TERMINATING FIBER OPTIC TRANSMISSION MEMBERS

[75] Inventor: Bernard G. Caron, Harrisburg, Pa.

[73] Assignee: AMP Incorporated, Harrisburg, Pa.

[21] Appl. No.: 810,826

[22] Filed: Dec. 18, 1985

Related U.S. Application Data

[63] Continuation of Ser. No. 501,597, Jun. 6, 1983, abandoned, which is a continuation-in-part of Ser. No. 415,123, Sep. 7, 1982.

[51] Int. Cl.⁴ .............................................. G02B 6/36
[52] U.S. Cl. ............................. 350/96.21; 350/96.20; 350/96.10
[58] Field of Search ................ 350/96.20, 96.21, 96.12

[56] References Cited

U.S. PATENT DOCUMENTS

| | | | |
|---|---|---|---|
| 3,999,837 | 12/1976 | Bowen et al. ..................... | 350/96.22 |
| 4,084,308 | 4/1978 | Runge ........................ | 350/96.20 X |
| 4,127,319 | 11/1978 | Forney, Jr. et al. ......... | 350/96.22 X |
| 4,178,068 | 12/1979 | Hoover ............................. | 350/96.21 |
| 4,186,998 | 2/1980 | Holzman ...................... | 350/96.20 X |
| 4,233,724 | 11/1980 | Bowen et al. ......................... | 29/428 |
| 4,418,983 | 12/1983 | Bowen et al. ................ | 350/96.20 X |
| 4,447,121 | 5/1984 | Cooper et al. ............... | 350/96.21 X |

*Primary Examiner*—William L. Sikes
*Assistant Examiner*—Akm E. Ullah
*Attorney, Agent, or Firm*—Adrian J. LaRue; Anton P. Ness

[57] ABSTRACT

A fiber optic connector comprises a housing member and ferrule members. The housing member is rigid and has a profiled bore extending therethrough. The bore has a central cylindrical surface, tapered surface on each side of the central cylindrical surface, and a support surface at the outer end of each tapered sections. The ferrule members are of resilient deformable material and are terminated onto fiber optic transmission members. Each ferrule member has a profiled front end comprising a front cylindrical sections of slightly larger diameter than the central cylindrical section, a tapered section slightly smaller than the bore tapered surface and an alignment section for tight engagement with the support surfaces. A coupling member engages shoulder members of the ferrule members urging the profiled front ends into the profiled bore with the front cylindrical sections tightly engaging the central cylindrical surface thereby applying a radial compressive force to the front cylindrical sections and centering and axially aligning the fiber optic transmission members and the alignment sections of the ferrule members tightly engaging the support surfaces of the housing members to maintain the ferrule members in alignment when lateral forces are applied to the ferrule members. The ferrule member can be made with a domed front end so that during termination to a fiber optic transmission member, the domed front end can be polished along with a protruding end of the fiber optic member to create a polished flat front end surface of the ferrule and fiber.

6 Claims, 9 Drawing Figures

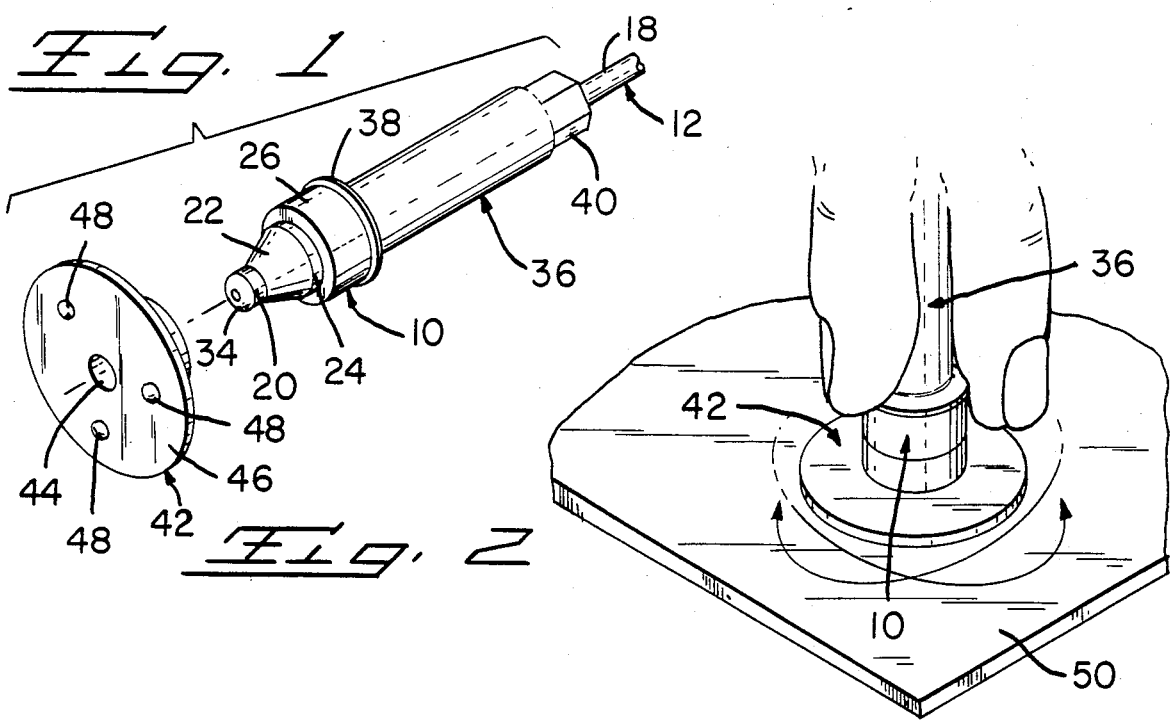
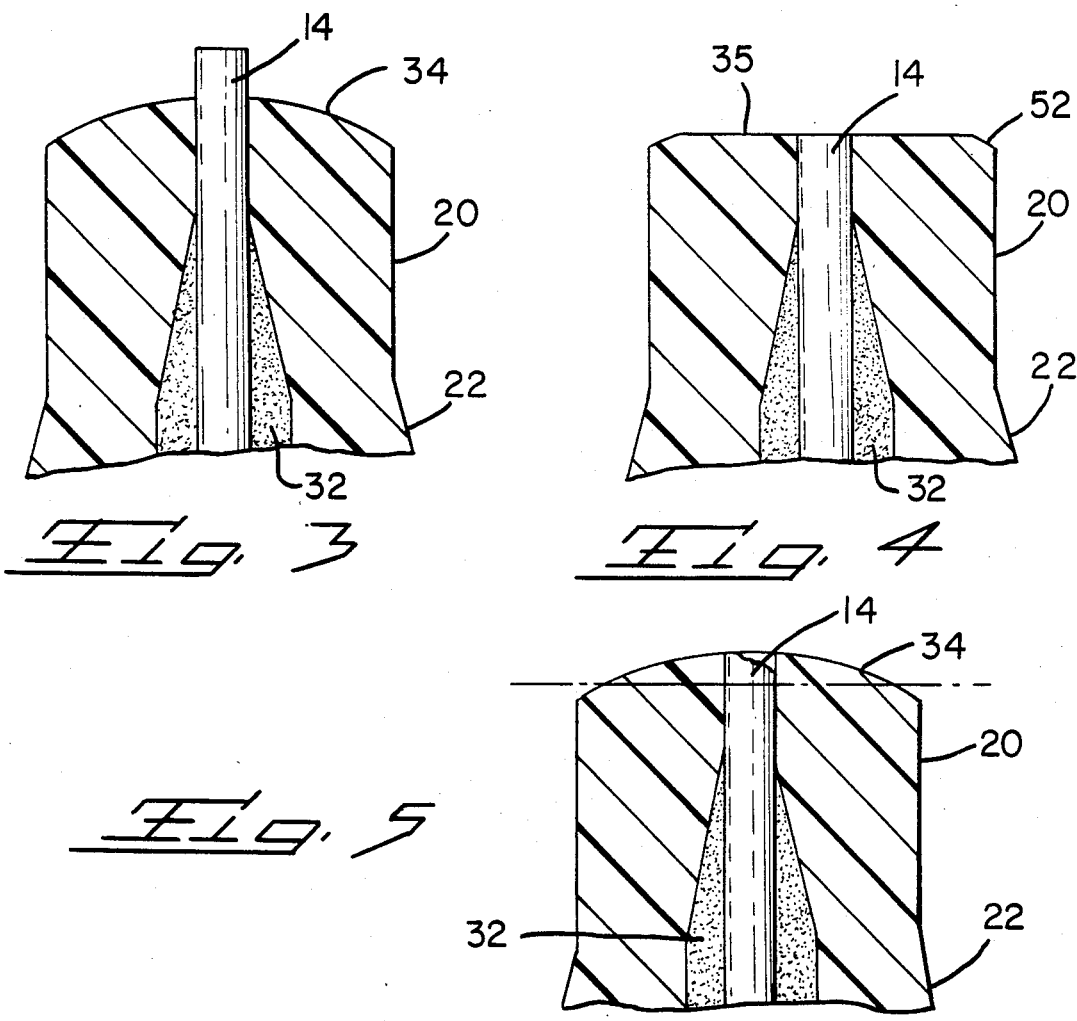

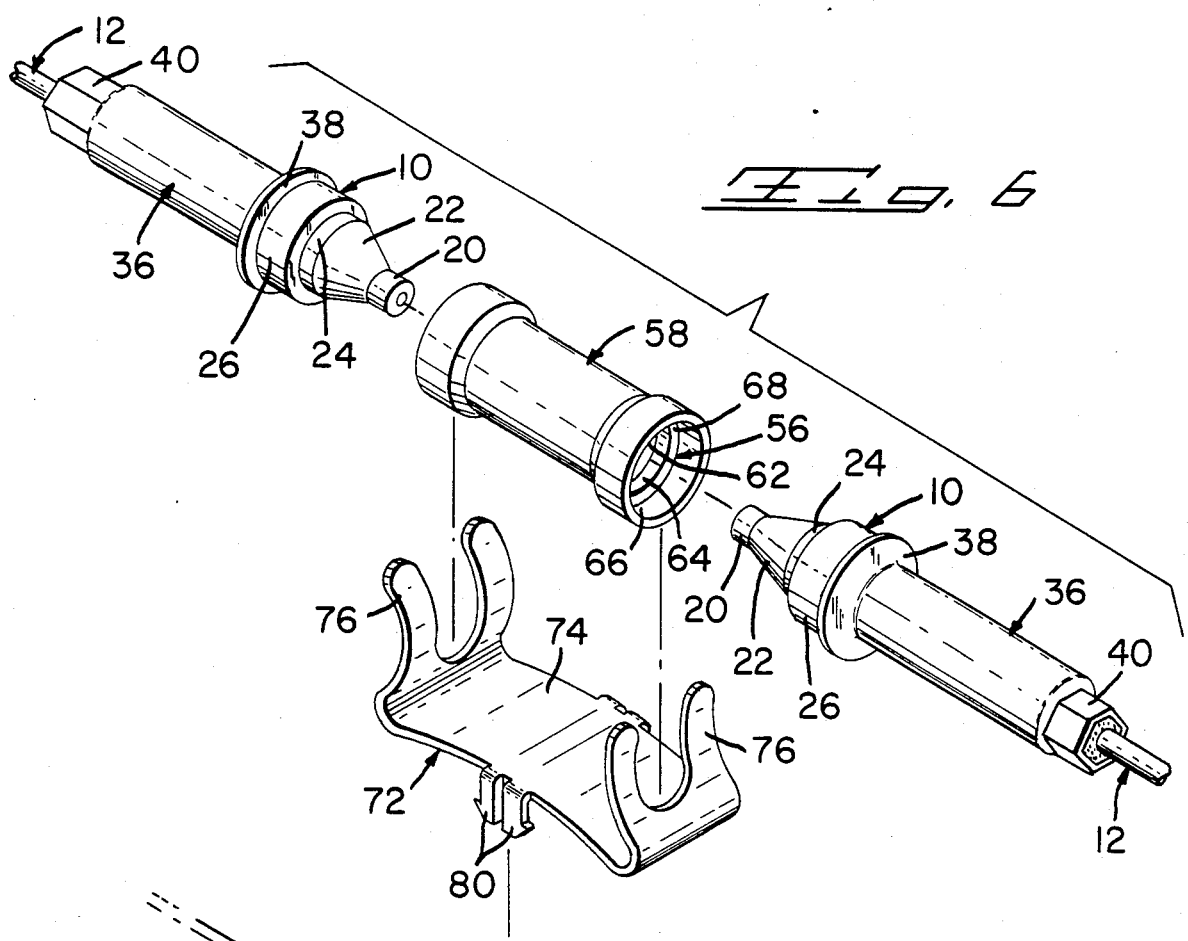
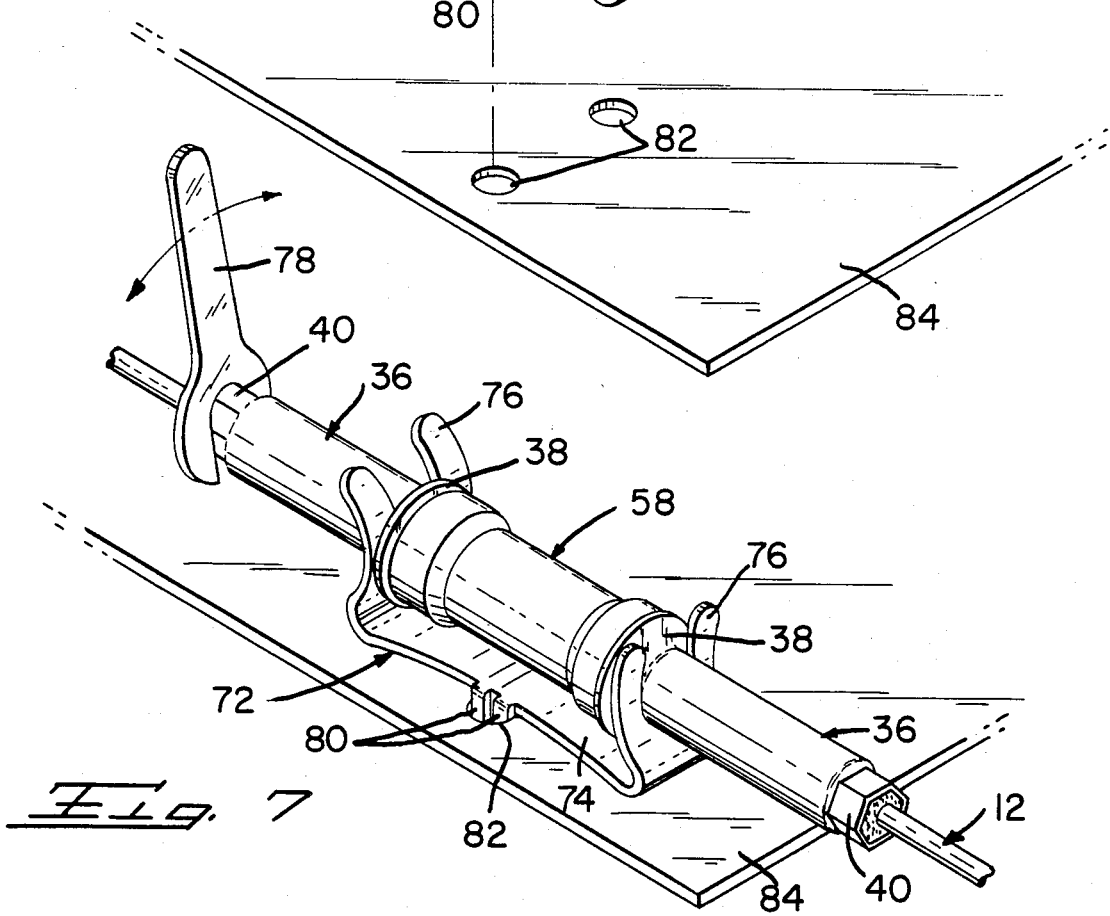

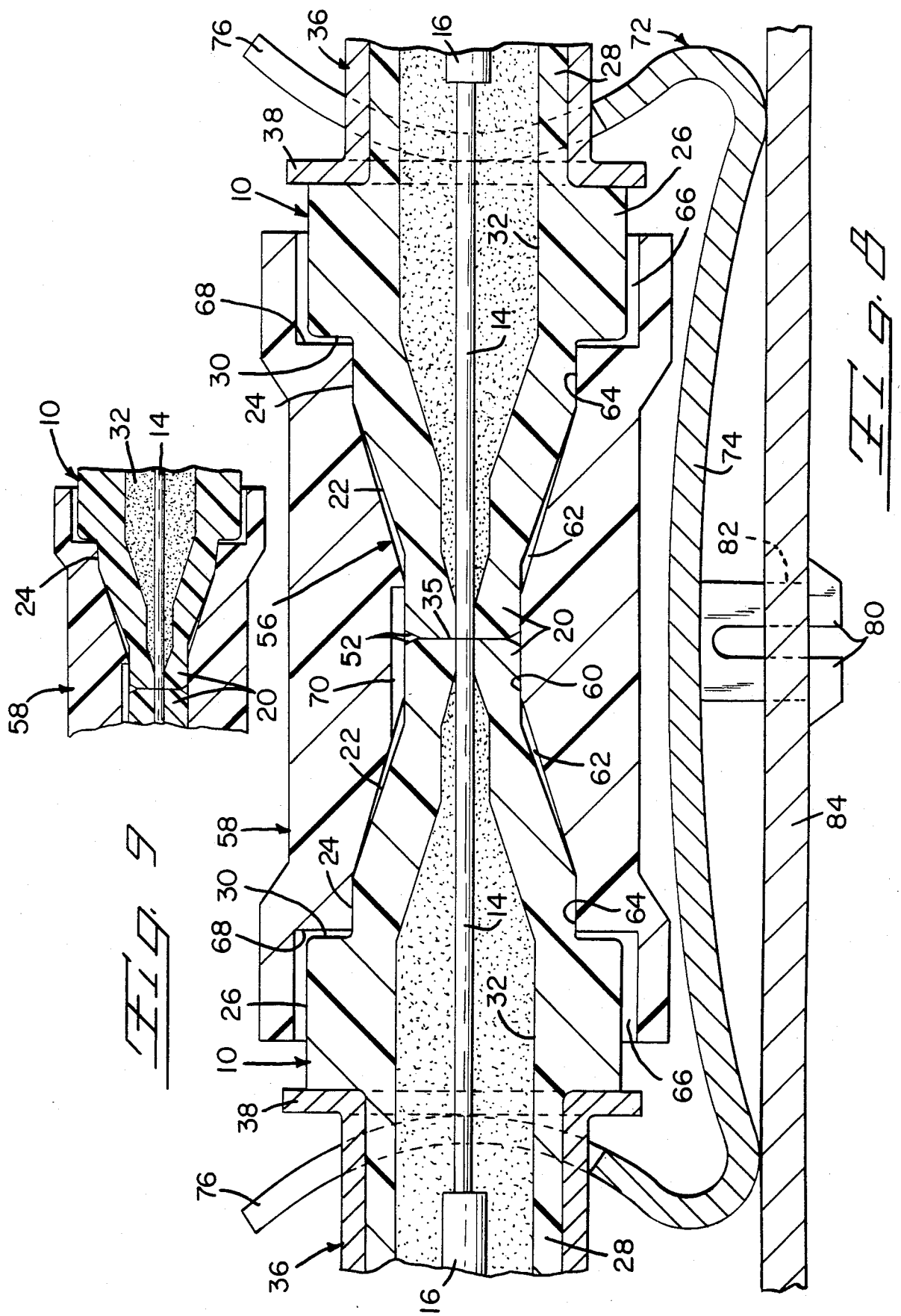

FIBER OPTIC CONNECTOR AND METHOD FOR TERMINATING FIBER OPTIC TRANSMISSION MEMBERS

REFERENCE TO RELATED APPLICATIONS

This is a continuation of application Ser. No. 501,597 filed June 6, 1983 now abandoned, which was a continuation-in-part of application Ser. No. 415,123 filed Sept. 7, 1982.

FIELD OF THE INVENTION

This invention relates to connectors and more particularly to fiber optic connectors for terminating fiber optic transmission members including matable supporting surfaces.

BACKGROUND OF THE INVENTION

U.S. Pat. No. 3,999,837 discloses a fiber optic connector which comprises a housing member and ferrule members terminated onto exposed ends of fiber optic transmission members. The housing member has a profiled bore including a center cylindrical section and outer first and second identically-shaped sections of different diameters. The ferrule members have cylindrical nose sections that tightly fit into the cylindrical section of the housing, tapered sections that engage the outer first and second sections, and annular shoulders that engage rearwardly facing surfaces of the housing member. Coupling members on the ferrule members are coupled to the housing member securing the ferrule members in the profiled bore with the cylindrical section applying radial compressive forces to the cylindrical nose sections thereby axially aligning the fiber optic transmission members and the annular shoulders engage the surfaces of the housing member limiting movement of the ferrule members into the profiled bore, positioning the front surfaces of the ferrule members adjacent each other and minimizing misalignment of the fiber optic transmission members when lateral forces are applied to the ferrule members.

When the annular shoulders of the ferrule members do not engage the axial surfaces of the housing member, lateral forces can cause misalignment of the fiber optic transmission members. Misalignment of single mode and multimode fibers can result in signal loss or degradation.

SUMMARY OF THE INVENTION

According to the present invention, a fiber optic connector comprises a housing member and ferrule members. The housing member is rigid and has a profiled bore extending therethrough. The bore has a central cylindrical surface, tapered surfaces on each side of the central cylindrical surface, and a support surface at the outer end of each tapered surface. The ferrule member each is of resilient deformable material, and each is terminated onto a respective fiber optic transmission member. Each ferrule member has a profiled front end comprising a front cylindrical section of slightly larger diameter than the central cylindrical surface, a tapered section slightly smaller than the bore tapered surfaces and an alignment section for tight engagement with the support surfaces. A coupling member engage shoulder members of the ferrule members urging the profiled front ends into the profiled bore, with the front cylindrical sections being tightly engaged by the central cylindrical surface at a first or forward location along the ferrule thereby applying a radial compressive force to the front cylindrical sections and centering and axially aligning the fiber optic transmission members, and with the alignment sections of the ferrule members being tightly engaged by the support surfaces of the housing member at a second or rearward location along the ferrule to maintain the ferrule members in alignment when lateral forces are applied to the ferrule members.

According to another aspect of the invention, the ferrule member can be made with a domed front end so that during termination to a fiber optic transmission member, the domed front end can be polished along with a protruding end of the fiber optic member to create a polished flat front end surface of the ferrule member and fiber.

BRIEF DESCRIPTION OF THE DRAWINGS

FIG. 1 is a perspective view of a ferrule member terminated to a fiber optic transmission member and a polishing fixture exploded therefrom.

FIG. 2 is a perspective view showing the polishing of the front end of the ferrule member and fiber optic transmission member.

FIG. 3 is a longitudinal section view of the front end of the ferrule member terminated onto a fiber optic transmission member prior to polishing.

FIG. 4 is a view similar to FIG. 3 after the front end of the ferrule member and fiber optic transmission member have been polished.

FIG. 5 is a view similar to FIG. 3 showing a cleaved end of a fiber optic transmission member prior to polishing the front end of the terminated ferrule member.

FIG. 6 is a perspective and exploded view of a fiber optic connector utilizing ferrule members of FIG. 4.

FIG. 7 is a view similar to FIG. 6 showing the connector in an assembled condition and being fine tuned to accurately align the axes of the fiber optic transmission members.

FIG. 8 is a longitudinal section view of FIG. 7.

FIG. 9 is a part cross-sectional view of an alternative embodiment.

DETAILED DESCRIPTION OF THE INVENTION

A ferrule member 10 is terminated onto an end of a fiber optic cable 12. The fiber optic cable 12 includes a fiber optic transmission member 14 surrounded by cladding material to enable light to be transmitted therealong. Buffer material 16 as shown in FIG. 8 protects the cladded fiber optic transmission member 14 and an outer jacket 18 protects the entire cable assembly. The cable typically includes strength members (not shown) to provide tensile strength thereto. Fiber optic cable 12 is stripped to expose a length of fiber optic transmission member 14 to enable it to be terminated in ferrule member 10. Fiber optic transmission member 14 can be either plastic or glass.

Ferrule member 10 is preferably molded from a suitable plastic material having resilient characteristics. Ferrule member 10 is of the type disclosed in U.S. Pat. No. 3,999,837, the disclosure of which is completely incorporated herein by reference. Ferrule member 10 has a profiled front end which comprises a front cylindrical section 20, a tapered section 22, an intermediate cylindrical section 24, a rear cylindrical section 26, and a tubular section 28. A shoulder 30 is located at the junction of sections 24 and 26. A profiled bore 32 extends through ferrule member 10 and necks down in front cylindrical section 20 to a diameter to accommodate fiber optic transmission member 14. Front surface 34 of ferrule member 10 has a domed configuration when formed as best illustrated in FIG. 3. A metal ferrule 36 is disposed on tubular section 28 and has a flange 38 in engagement with section 26. Outer end 40 of metal ferrule 36 has a hexagonal or other suitable configuration.

Fiber optic cable 12 is terminated in ferrule member 10 by inserting a stripped end of fiber optic cable 12 within bore 32 until a short section of fiber optic transmission member 14 extends outwardly beyond domed front end 34. An epoxy resin can be located in bore 32 to secure fiber optic transmission member 14 in position in ferrule member 10, whereafter metal ferrule 36 is crimped onto outer jacket 18 of fiber optic cable 12 thereby terminating fiber optic cable 12 in ferrule member 10. The section of fiber optic transmission member 14 that extends beyond domed front end 34 is removed by cutting, if transmission member 14 is plastic, or is cleaved, if transmission member 14 is glass. Fiber optic cable 12 can be secured in ferrule member 10 in accordance with the teachings of U.S. patent application Ser. No. 381,495 filed May 24, 1982 or in any other suitable manner.

After fiber optic cable 12 has been terminated in ferrule member 10, the profiled front end of ferrule member 10 is frictionally positioned in a profiled bore 44 of polishing fixture 42; bore 44 has the same configuration as that of sections 20, 22, and 24 of ferrule member 10 except that they are dimensioned to compress section 20 in tight engagement with the fiber optic transmission member 14 in bore 32 and the domed front end 34 extends beyond the outer flat surface 46 of fixture 42. Radiussed projections 48 extend outwardly from surface 46.

Terminated ferrule member 10 with fixture 42 thereon is now subjected to a polishing action by fixture 42 moving relative to a polishing medium 50 such as, for example, very fine silicon carbide or aluminum oxide grit as shown in FIG. 2 for a period of time. Radiussed projections 48 stabilize the polishing and, when they are worn away, the domed front surface 34 along with the end of fiber optic transmission member 14 are polished as a flat surface 35 and are in the same plane as illustrated in FIG. 4 leaving a radiussed peripheral surface 52 between the front polished surface 35 and the external surface of cylindrical section 20.

As shown in FIG. 5, when fiber optic transmission member 14 is glass and is cleaved, the cleaved end can be uneven. Thus, when the domed front end 34 is polished as hereinabove described, the uneven end of fiber optic transmission member 14 is polished to a flat planar configuration as shown in FIG. 4 thereby eliminating the fragmented end.

Advantages of having a domed front surface 34 are less material to polish and this reduces the amount of time to polish the front end of ferrule member 10.

Terminated ferrule members 10 can now be connected together in a profiled bore 56 of a rigid connector housing member 58 which is of the type disclosed in U.S. patent application Ser. No. 415,123 filed Sept. 7, 1982, the disclosure of which is incorporated herein by reference. Profiled bore 56 has a central cylindrical surface 60, tapered surfaces 62 on each side of surface 60, cylindrical support surfaces 64, and outer cylindrical surfaces 66. Shoulders 68 are located at the junctions between surfaces 64 and 66. A slot 70 is located in communication with central cylindrical surface 60 as shown in FIG. 8.

The diameters of front cylindrical sections 20 of ferrule members 10 are slightly greater than the diameter of central cylindrical surface 60 of bore 56 and this is also true with respect to intermediate cylindrical sections 24 of ferrule members 10 being slightly greater than cylindrical support surfaces 64 of profiled bore 56. The dimensions of tapered sections 22 of ferrule members 10 are slightly less than that of tapered surfaces 62 of profiled bore 56. Thus, when the profiled front ends of ferrule members 10 are inserted into profiled bore 56, ferrule members 10 will be tightly engaged by central cylindrical surface 60 at respective first or forward locations along the ferrules; the resilient nature of the material of ferrule member 10 will cause the front sections 20 to be compressibly reduced in diameter as a result of a radial compressive force being applied by housing member 58 thereby concentrically aligning end portions of fiber optic transmission members 14 so that they are axially aligned within central cylindrical surface 60 of profiled bore 56 as shown in FIG. 8. The tight engagement of intermediate cylindrical alignment sections 24 with corresponding cylindrical support surfaces 64 will support the ferrule members 10 at respective second or rearward locations therealong within bore 56 to resist lateral forces being applied to the outer ends of ferrule members 10 and to form a seal thereat as disclosed in U.S. Pat. No. 4,614,402. Depending on the tolerances involved, shoulders 30 of ferrule members 10 can abut against shoulders 68 of housing member 58 limiting the movement of ferrule members 10 within bore 56. Alignment sections 24 can be slightly tapered along with support surfaces 64, if desired, as shown in FIG. 9.

In many cases, a fluid that has an index of refraction substantially equal to that of fiber optic transmission members 14 is located at the interface between the flat front surfaces 35 of ferrule members 10 which enhances the transmission of light between the fiber optic transmission members 14 and protects the front ends of the fiber optic transmission members 14 when engagement therebetween takes place. The reservoir formed by radiussed surfaces 52 at the peripheries of the front ends of sections 20 of ferrule members 10 as shown in FIG. 8 will enable the fluid to be collected therein upon expansion of the fluid as a result of higher temperature and the fluid can also move into slot 70 if the temperatures are quite high. The fluid will be retained within the fiber optic connector by virtue of the seal formed between sections 24 and 64. Slot 70 also acts as a vent to prevent hydraulic action from taking place when index-matching fluid is used; slot 70 also can prevent entrapped air from forcing the ferrule members apart under high temperature if no index-matching liquid is used.

Spring clip member 72 forms a coupling member which engages ferrule members 10 urging them into bore 56 and maintaining them therein. Spring clip member 72 is stamped and formed from a metal having suitable spring characteristics such as, for example, spring steel, and it includes an arcuate-shaped base member 74 from the ends of which extend curved forks 76. A fiber optic connector which comprises the profiled front ends of ferrule members 10 disposed in profiled bore 56 of rigid housing 58 is positioned in spring clip member 72 with metal ferrules 36 being disposed in curved forked ends 76 as shown in FIGS. 7 and 8, with the curved forked ends 76 engaging against flanges 38 of metal ferrules 36 thereby applying axial forces onto ferrule members 10 to maintain cylindrical sections 20 in concentric alignment within central cylindrical surfaces 60 of profiled bore 56 of housing member 58 thereby maintaining fiber optic transmission members 14 in axial alignment due to the resilient characteristics of ferrule members 10. The arcuate configuration of base member 74 contributes to the spring characteristics of forked ends 76. Other types of coupling members can, of course, be used such as, for example, threaded members, bayonet members or the like, and coil springs would then be used on metal ferrules 36.

After the fiber optic connector has been positioned in spring clip member 72, light can be transmitted along fiber optic transmission members 14 to determine if further alignment is necessary. If further alignment is necessary, a wrench 78 is used on outer end 40 of one of metal ferrules 36 and the corresponding ferrule member 10 can be rotated to accurately align the axes of fiber optic transmission members 14.

A pair of barbed legs 80 extend outwardly from base member 74 on each side at a central location thereof for engagement with holes 82 in a mounting plate 84. Legs 80 need not be present so that spring clip member 72 can maintain the fiber optic connector in a connected condition in a free-hanging manner if desired.

From the foregoing, a fiber optic connector has been described that is sealed from the environment, can withstand wide temperature variations, can be used in many types of installations, enables the fiber optic connectors to be readily disconnected, enables the fiber optic connectors to be adjusted to provide low loss connection, enables the terminations to be tested, and provides a reservoir to accommodate expansion and contraction variations of a fluid disposed between the front ends of mated ferrule members.

I claim:

1. An improved ferrule means for use in terminating a fiber optic transmission means, the improvement comprising a front end on said ferrule means having a domed configuration prior to the fiber optic transmission means being terminated in said ferrule means and the domed front end along with an end of said fiber optic transmission means being polishable to form a planar front surface of said front end of said ferrule means and said fiber optic transmission means, whereby less material need be polished and less time is required to polish the front ferrule end to form said planar front surface.

2. An improved ferrule means for use in terminating a fiber optic transmission means, the improvement comprising a front end on said ferrule means having a domed configuration at least prior to the fiber optic transmission means being terminated in said ferrule means, whereby when an end of said fiber optic transmission means extending forwardly of said domed front end of said ferrule means is subjected to polishing action, less surface area of said front end engages the polishing medium.

3. A method of terminating an end of a fiber optic transmission means within a ferrule means prior to connecting said fiber optic transmission means to a mating fiber optic transmission means, comprising the steps of:
   molding the ferrule means from a suitable material with a front end of the ferrule means having a domed configuration and a bore extending through the ferrule means and through the domed front end;
   securing the end of the fiber optic transmission means in the bore with a front end of the fiber optic transmission means being coincident with a front surface of the domed front end; and
   polishing the domed front end and the front end of the fiber optic transmission means thereby forming a flat polished surface of the front end of the ferrule means including a flat polished surface of the front end of the fiber optic transmission means, said domed front end presenting less material needed to be polished and less time required therefor.

4. A method as set forth in claim 3, wherein a radiused peripheral surface is formed during the polishing step at the flat polished front surface of the ferrule means.

5. A method of terminating an end of a fiber optic transmission means within a ferrule means prior to connecting said fiber optic transmission means to a mating fiber optic transmission means, comprising the steps of:
   forming the ferrule means with a front end of the ferrule means having a domed configuration and a bore extending through the ferrule means and through the domed front end;
   securing the end of the fiber optic transmission means in said bore with a front end of said fiber optic transmission means extending forwardly of said domed front end; and
   moving said domed front end and said front end of said fiber optic transmission means relative to a polishing medium thereby polishing at least said front end of said fiber optic transmission means, whereby said domed front end of said ferrule means presents less surface area to engage said polishing medium.

6. A method as set forth in claim 5 wherein said domed front end is polished to form a flat polished surface coincident with the front end of said fiber optic transmission means.

* * * * *